United States Patent Office 2,929,821
Patented Mar. 22, 1960

2,929,821

3 AMINO-4,7-DIHYDROXY-8-METHYL-COUMARIN AND AMIDE DERIVATIVES THEREOF

Herman Hoeksema and Edgar Louis Caron, Kalamazoo Township, Kalamazoo County, and Jack W. Hinman, Kalamazoo, Mich., assignors to The Upjohn Company, Kalamazoo, Mich., a corporation of Michigan No Drawing. Application April 5, 1956
Serial No. 576,233

6 Claims. (Cl. 260—343.2)

This invention relates to novel compositions of matter and to a process for the preparation thereof and is particularly directed to novel compositions of matter derived from novobiocin.

This application is a continuation-in-part of application Serial No. 550,817 filed December 5, 1955.

Novobiocin, also known as streptonivicin, Antibiotic 66a, and by the trademark Albamycin (Registered U.S. Patent Office), is an antibiotic substance obtained as an elaboration product of *Streptomyces niveus*. As set forth in copending U.S. applications of Dietz, DeBoer, Smith, Bergy, and Hoeksema, Serial No. 516,742, filed June 20, 1955, now abandoned and Serial No. 557,965, filed January 9, 1956, novobiocin is characterized by an optical rotation $[\alpha]_D^{23-26°}$=minus 63.0 degrees ($c$, one percent in absolute ethanol, two decimeters); by being very soluble in water above a pH of 9 with its solubility decreasing to about zero as the pH decrease from 9.0 to 5.0; by being soluble in lower alkanols and acetone; by the following elemental analysis:

| Element: | Percent |
|---|---|
| Carbon | 59.69 |
| Hydrogen | 6.66 |
| Nitrogen | 4.48 | by a molecular weight of about 618; by an empirical formula of about $C_{30-32}H_{36-42}O_{11-12}N_2$; by the presence of two acidic groups: $pKa_1$ 4.3, $pKa_2$ 9.1 in water, and $pKa_1$ 5.7 and $pKa_2$ 11.9 in dimethylformamide; by existing in two crystal forms, Form 1 melting with decomposition between 174 and 178 degrees centigrade and Form 2 melting with decomposition between 149 and 151 degrees centigrade, which forms have characteristic infrared absorption spectra and X-ray diffraction patterns as set forth in the above-mentioned copending applications; by forming acid and neutral salts with both inorganic and organic bases; by ultraviolet absorption maxima at 334 millimicrons in an 0.01 normal sulfuric acid solution in 70 percent aqueous ethanol and 311 millimicrons in an 0.01 normal potassium hydroxide solution in 70 percent aqueous ethanol; by ultraviolet inflections at 250, 262, 282, and 304 millimicrons in an 0.01 normal sulfuric acid solution in 70 percent aqueous ethanol and at 237, 255, and 287 millimicrons in an 0.01 normal potassium hydroxide solution in 70 percent aqueous ethanol; and by activity against a large number of gram-positive and gram-negative bacteria.

It has now been found that novel compositions of matter according to this invention are obtained by acting upon novobiocin (I) with acetic anhydride. By this procedure, the novobiocin molecule is cleaved yielding a new compound which has been identified as 3-(2-isopentenyl)-4-acetoxybenzoic acid (Ai), which on alkaline hydrolysis is converted to 3-(2-isopentenyl)-4-hydroxybenzoic acid (Aii), and on hydrogenation over platinum oxide to 3-isoamyl-4-acetoxybenzoic acid (Aiv). The latter compound (Aiv) on alkaline hydrolysis yields 3-isoamyl-4-hydroxybenzoic acid (Av). When 3-(2-isopentenyl)-4-acetoxybenzoic acid is refluxed in the presence of concentrated hydrochloric acid, it is converted to the known 2,2-dimethyl-6-chromancarboxylic acid (Aiii) [J.A.C.S. 65, 289–93 (1943)].

These reactions are illustrated in the following chart:

CHART 1

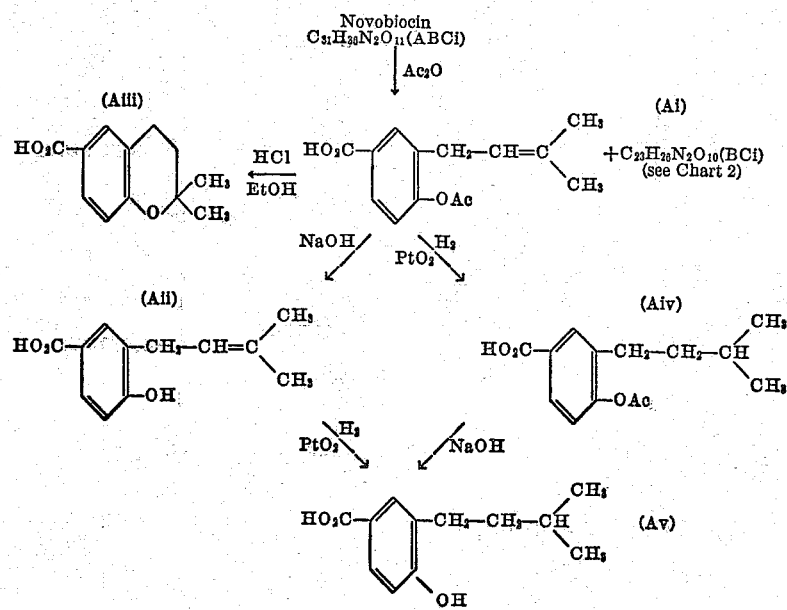

It has been found further that when novobiocin (ABCi) is treated with four normal hydrochloric acid in sixty percent aqueous ethanol, it is converted to ethyl 3(0)-carbamyl-4(0),5,5-trimethylpentopyranoside (Cii) having the formula $EtOC_9H_{16}NO_5$ and 3-(2,2-dimethyl-6-chromancarboxamido)-4,7-dihydroxy-8-methylcoumarin (ABi). On refluxing the latter compound with acetic anhydride, there is obtained 2,6-dimethyl-6-chromancarboxylic acid (Aiii) and 2-methyl-5-(2-hydroxy-3-methyl-4-acetoxyphenyl)-4-oxazolecarboxylic acid, delta-lactone, (Bii). This compound by acid hydrolysis, as in methanolic hydrochloric acid, yields 3-amino-4-hydroxy-7-acetoxy-8-methylcoumarin hydrochloride (Biv.HCl) which on alkaline hydrolysis, as with aqueous sodium hydroxide, yields 3-amino-4,7-dihydroxy-8-methylcoumarin (Bi). When this compound is reacted with benzoyl chloride there is obtained 3-benzoylamido-4,7-dihydroxy-8-methylcoumarin (Biii) which on reaction with acetic anhydride regenerates the 2,6-dimethyl-7-acetoxy-4H[1]-benzopyrano-[3,4-d]-oxazole (Bii). The above oxazole on alkaline hydrolysis as with aqueous sodium hydroxide yields 3-acetamido-4,7-dihydroxy-8-methylcoumarin (Bvi) which in methanolic hydrochloric acid is deacetylated to 3-amino-4,7-dihydroxy-8-methylcoumarin hydrochloride (Bi.HCl) which readily converts in water to the free base Bi.

The above sequence of reactions is illustrated in the following chart:

When 3-amino-4,7-dihydroxy-8-methylcoumarin (Bi) is treated with one normal aqueous sodium hydroxide for several days at room temperature, or with Benedict's reagent, there is obtained upon acidification the known 2,6-dihydroxy-m-toluic acid (Bvii) (J. Chem. Soc. 1938, 1828). Decarboxylation of this acid or fusion of 3-amino-4,7-dihydroxy-8-methylcoumarin (Bi) with potassium hydroxide yields the known 2-methylresorcinol (Bviii) (J. Chem. Soc. 1932, 1690).

The above sequence of reactions is illustrated in the following chart:

CHART 3

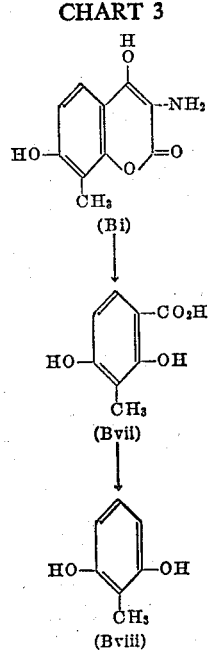

CHART 2

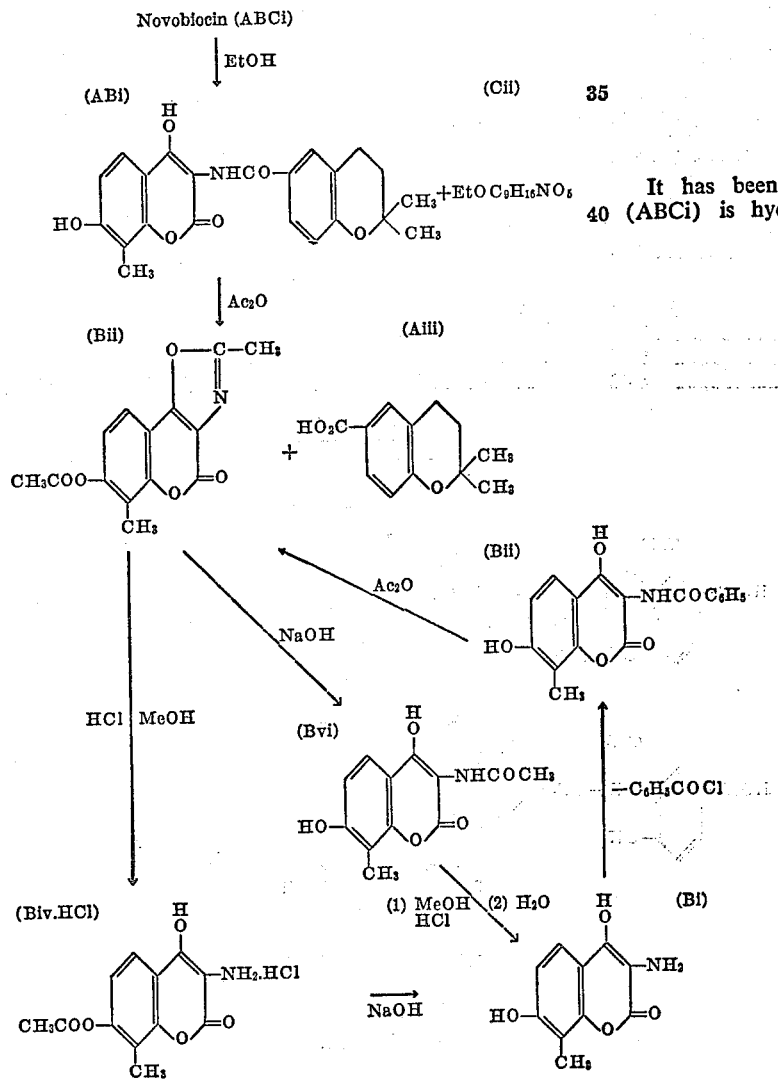

It has been found further that when novobiocin (ABCi) is hydrogenated over platinum oxide to dihydronovobiocin (ABCii) (see copending application Serial No. 545,307, filed November 7, 1955, now abandoned) and the latter refluxed with acetic anhydride, there are obtained 3-isoamyl-4-acetoxybenzoic acid (Aiv) and compound BCi. Compound BCi also is obtained along with 3(2-isopentenyl)-4-acetoxybenzoic acid (Ai) on reacting novobiocin (ABCi) with acetic anhydride. Compound BCi has the following formula:

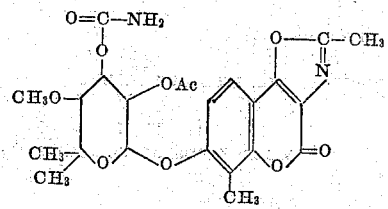

When compound BCi is reacted with sodium methoxide, the acetyl group (Ac) is hydrolyzed to form compound BCiv. Acid hydrolysis of compound BCiv with methanolic hydrochloric acid yields 3-amino-4,7-dihydroxy-8-methylcoumarin (Bi) and methyl 3(O)-carbamyl-4(O),5,5-trimethylpentopyranoside (Ci) of the formula $$MeOC_9H_{16}NO_5$$

having the same carbamyl glycoside moiety as the ethyl 3(O)-carbamyl-4(O),5,5-trimethyl pentopyranoside (Cii).

The above sequence of reactions and the formulas of the pyranoside (Ci) are illustrated in the following chart:

ammonia with the formation of a cyclic carbonate ester (Ciii) having the formula $MeOC_9H_{13}O_5$. Treatment of the carbonate ester with the stoichiometric amount of aqueous barium hydroxide effects precipitation of the theoretical amount of barium carbonate and yields methyl 4(O),5,5-trimethylpentopyranoside (Civ) having the formula $MeOC_9H_{15}O_5$.

The methyl and ethyl 3(O)-carbamyl-4(O),5,5-trimethylpentopyranosides (Ci) and (Cii) are neutral, non-hydrin-negative, and show only end absorption in the ultraviolet. The methyl 3(O)-carbamyl-4(O),5,5-trimethylpentopyranoside (Ci) melts at 197–198 degrees centigrade and has an optical rotation $[\alpha]_D^{25}$=minus 36 degrees (c, 1 in EtOH). The carbonate ester (Ciii) has a melting point of 132–132.5 degrees centigrade.

When the methyl 4(O),5,5-trimethylpentopyranoside (Civ) is hydrolyzed with sulfuric acid there is obtained 4(O),5,5-trimethylaldopentose (Cv). Mild acid hydrolysis of methyl 3(O)-carbamyl-4(O),5,5-trimethylpentopyranoside (Ci) yields 3(O)-carbamyl-4(O),5,5-trimethylpentopyranose (Cvi). Further hydrolysis yields the aldopentose Cv. When the aldopentose Cv is hydrogenated with Raney nickel, or by the procedures of U.S. Patents 2,280,975 and 2,292,293, there is obtained the polyol, 1,2,3,5-tetrahydroxy-4-methoxy-5-methylhexane (Cvii), $$CH_2OH \cdot (CHOH)_2 \cdot CHOCH_3 \cdot CCH_3OH \cdot CH_3$$

The above sequence of reactions is shown in the following chart:

CHART 4

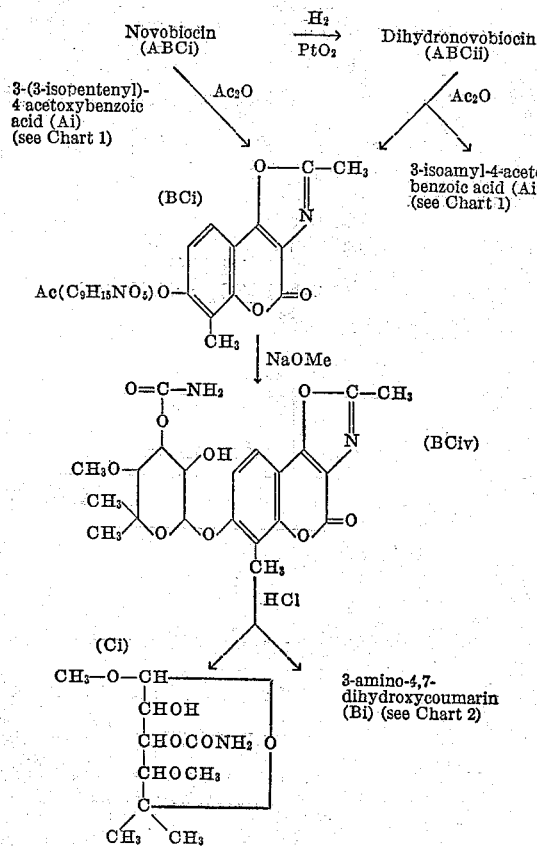

When methyl 3(O)-carbamyl-4(O),5,5-trimethylpentopyranoside (Ci) is treated with boiling methanolic hydrogen chloride, the neutral nitrogen is eliminated as

CHART 5

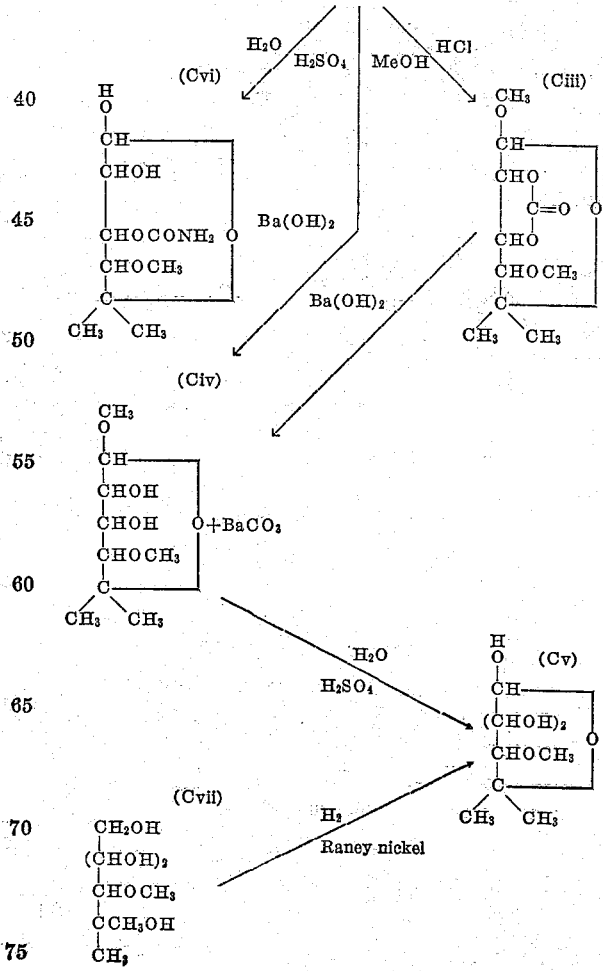

The foregoing reactions and sequences permit assignment of the following structure for novobiocin:

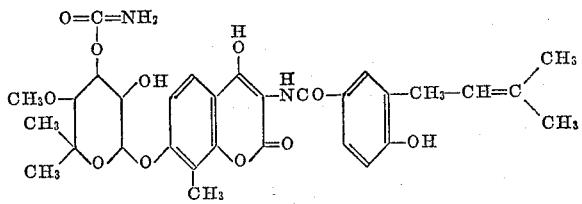

The novel compounds of this invention are useful as intermediates, as buffers, as antiseptics and disinfectants, and as antioxidants, germination inhibitors, and agents for the resolution of racemic acids. The carboxylic acids Ai, Aii, Aiii, Aiv, and Av are useful as buffers, as antiseptics and disinfectants. Also they can be converted to compounds having local anesthetic properties by first reacting them with thionyl chloride to form the acid chloride and then with dimethylaminoethanol or with pyrrolidylalkanols according to the procedure set forth in U.S. Patent 2,719,851. In compounds Aii and Av the phenolic hydroxyl group can be etherified by reaction with an alkyl halide or aralkyl halide such as methyl, ethyl, n-propyl, isopropyl, amyl, 2-ethylhexyl, and benzyl chlorides, or by other known methods such as reaction with dialkyl sulfates or diazomethane. Compound Bi is useful for the inhibition of seed germination. These ethers also are useful as buffers, antiseptics and disinfectants, and as intermediates in the formation of local anesthetics according to U. S. Patent 2,719,851. The pyranosides Ci, Cii, Civ, Cv, and Cvi contain an esterifiable hydroxyl group (Civ contains two) and can be used for resolving racemic acids such as d,1-mandelic and d,1-tropic acids. The resorcinol derivatives, 2,6-dihydroxy-m-toluic acid and 2-methyl resorcinol, are useful as germicides and fungicides both as such and as their mono ethers and esters such as the mono methyl ethers and mono acetates.

When 3-amino-4,7-dihydroxy-8-methylcoumarin is reduced with lithium aluminum hydride, 2-methyl-4-(1,3-dihydroxy-2-aminopropyl)-resorcinol is obtained. This reaction is represented as follows:

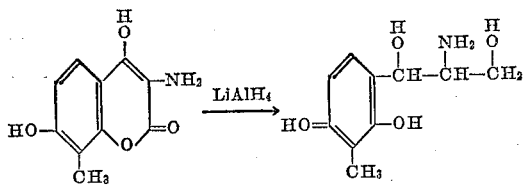

The resulting compound, 2-methyl 4-(1,3-dihydroxy-2-aminopropyl)-resorcinol is useful as a fungicide, a germicide, an anthelmintic, and a bronchodilator. Its amine fluosilicate salts are useful as mothproofing agents in accordance with U.S. Patents 1,915,334 and 2,075,359. Also in accordance with U.S. Patents 2,425,320 and 2,586,331, its thiocyanate salt can be condensed with formaldehyde and other aldehydes to form useful pickling inhibitors. The N-alkylated analogues obtained by the lithium aluminum hydride reduction of the N-acylamino-4,7-dihydroxy-8-methylcoumarins, such as compounds Biii and Biv, are useful for the same purposes. The 2 - methyl 4 - (1,3 - dihydroxy - 2 - benzylaminopropyl)-resorcinol as well as other along chain alkylamino analogues such as are obtained by acylating compound Bi with long chain fatty acid halides, such as, lauroyl chloride and oleoyl chloride, in place of the benzoyl chloride and reducing the resulting amide with lithium aluminum hydride, are surfactants useful as detergents and wetting agents. Their combined wetting and germicidal and fungicidal properties make them particularly useful as antiseptics and disinfectants. The polyol Cvii can be used in place of such substances as sorbitol, manitol, and pentaerythritol as a levigating agent in pharmaceutical compositions, as a humectant and softening agent for tobacco, glue, lotions and creams, and the like, and as a plasticiser. Like the prior art polyols, also the polyol Cvii is converted to surfactants useful as detergent and wetting agents by mono-acylation with long chain fatty acid radicals. Polyol Cvii monolaurate, monopalminate, monostearate and monooleate are examples of surfactants which can be prepared from the compounds of this invention. The like polyacylates, for example, the distearate, can be used as ointment bases. The capric acid mono ester when prepared and formulated according to U.S. Patents 2,357,077 and 2,357,078 is useful as an insecticide. The esters with drying oil acids, such as linseed oil acid, when prepared according to Ind. and Eng. Chem. 37, 809–12 (1945), are useful as drying oils in varnish and the like.

The following examples are illustrative of the process and products of the present invention, but are not to be construed as limiting.

*Example 1.—3-(2-isopentenyl)-4-acetoxybenzoic acid (Ai)*

A solution containing 100 grams (0.162 mole) novobicin (ABCi), one liter pyridine, and 216 grams (2.14 moles) acetic anhydride was heated four hours under reflux. It was then chilled to five degrees centigrade and 1500 milliliters of water was added. The solution was then brought to pH2 by addition of 1030 milliliters of twelve normal hydrochloric acid. The resulting precipitate was filtered and dried (110 grams). It was then extracted with ether. The ether solution was evaporated to dryness and the residue was then crystallized from 400 milliliters ethanol and 600 milliliters of water to yield 26 grams of 3-(2-isopentenyl)-4-acetoxybenzoic acid (Ai), melting at 100–113 degrees centigrade. On recrystallization from ethanol, a product having the following properties was obtained:

(a) Melting point 116–120 degrees centigrade (with decomposition)
(b) pKa 5.67 (50% ethanol)
(c) Infrared absorption (mineral oil mull) very similar to acetylsalicylic acid
(d) Optical rotation, none
(e) Ultraviolet absorption:
  288 mµ a=63.2 (0.01N KOH 70% EtOH)
  234 mµ a=51.6 (0.01N $H_2SO_4$ 70% EtOH)
(f) *Analysis.—*

CALCULATED FOR $C_{14}H_{16}O_4$

| C | H | $CH_3\overset{O}{\underset{\|}{C}}$ | C—$CH_3$ | $H_2$ uptake | eq. wt. |
|---|---|---|---|---|---|
| 67.72 | 6.50 | 17.3 | 18.12 | 1 mole | 248.27 |
| FOUND | | | | | |
| 67.75 | 6.56 | 16.28 | 8.84 | 1.2 moles | 254.59 |
| 67.76 | 6.39 | | | | |

*Example 2.—Compound BCi*

The residue (51 grams) from the ether extraction was recrystallized from 750 milliliters of ethanol and 200 milliliters of water to yield 46.5 grams of an optically active neutral compound BCi having the following properties:

(a) Melting point 167–173 degrees centigrade
(b) Optical rotation, $[\alpha]_D^{24}$=minus 94.4 degrees (C, 2% in dimethylformamide)
(c) *Analysis.—*Calculated for $C_{23}H_{28}N_2O_{10}$: C, 56.32; H, 5.34; N, 5.71. Found: C, 56.65; H, 5.44; N, 5.74.

(d) Ultraviolet absorption in 0.01 normal sulfuric acid in 70% ethanol

| mμ | a value |
|---|---|
| 242 | 27.2 |
| 293 | 25.3 |
| 315 | 39.7 |
| 321 flex | 35.0 |
| 328 flex | 32.3 |

*Example 3.—3-(2-isopentenyl)-4-hydroxybenzoic acid (Aii)*

A solution of 0.5 gram (0.002 mole) 3-(2-isopentenyl)-4-acetoxybenzoic acid (Ai), twenty milliliters (0.020 mole) one normal sodium hydroxide, and fifty milliliters ethanol stood three hours at 25 degrees centigrade. It was then acidified with 3.3 milliliters of six normal hydrochloric acid to pH 2. The solution was distilled at sixteen millimeters mercury to an aqueous concentrate, and the resulting precipitate extracted into ether. The ethereal solution was dried over sodium sulfate and evaporated to dryness. The residue was crystallized from acetone and water by rapid evaporation of the acetone (crystallizing dish) to yield 350 milligrams (.0017 mole—85 percent) of 3-(2-isopentenyl)-4-hydroxybenzoic acid (Aii) characterized as follows:

(a) *Analysis.*—Calcd. for $C_{12}H_{14}O_3$: C, 69.88; H, 6.84; M. wt., 206.23. Found: C, 69.89; H, 6.94; eq. wt., 208.
(b) $pKa_1$ 6.2, $pKa_2$ 11.0, solvent 66 percent alcohol
(c) Melting point 103–106 degrees centigrade
(d) Ultraviolet absorption:
  288 mμ a=75.2 (0.01 normal KOH 70% EtOH)
  260 mμ a=68.2 (0.01 normal $H_2SO_4$ 70% EtOH)

*Example 4.—Ethyl 3-(2-isopentenyl)-4-hydroxybenzoate*

A solution of 55 grams of ethyl p-hydroxybenzoate in 200 milliliters of acetone was heated to reflux and fifty grams of anhydrous potassium carbonate added. While gently refluxing the solution, 33 grams of 3-methyl-3-chlorobutene (U.S. Patent 2,382,031) was added. The reaction mixture was heated under reflux with stirring for three hours. The acetone was distilled and enough water added to dissolve the salt and the resultant extracted with 150 milliliters of ether. To the ether extract there was added 100 milliliters of petroleum ether and the acidic components extracted with four portions of five percent aqueous sodium hydroxide. The solvent was then removed, the bulk by distilling and the rest by heating on a steam bath under reduced pressure for several hours. The resulting product, ethyl 4-(1,1-dimethylallyloxy)-benzoate, was heated to boiling under reduced pressure (40 mm. Hg) until the boiling point became constant. The product was then dissolved in forty milliliters of petroleum ether and extracted with five percent sodium hydroxide. The alkaline extract was acidified with dilute sulfuric acid and the phenolic product extracted with ether. Evaporation of the ether yielded the desired ethyl 3-(2-isopentenyl)-4-hydroxybenzoate which on hydrolysis by the procedure of Example 3 gave 3-(2-isopentenyl)-4-hydroxybenzoic acid (Aii).

*Example 5.—3-isoamyl-4-acetoxybenzoic acid (Aiv) and compound BCi*

(A) A solution of two grams of 3-(2-isopentenyl)-4-acetoxybenzoic acid (Ai) in fifty milliliters absolute ethanol was hydrogenated one hour at forty pounds per square inch gauge hydrogen with one gram Adams' catalyst ($PtO_2$). After filtration, the filtrate was treated with 150 milliliters water to yield 1.3 grams of a partially crystalline product which on recrystallization from warm ethanol-water yielded 1.06 grams of 3-isoamyl-4-acetoxybenzoic acid (Aiv) having a melting point of 136–144 degrees centigrade.

(B) A solution of two grams dihydronovobiocin (ABCii) (.0032 mole), twenty milliliters pyridine, and four grams acetic anhydride (.039 mole) was refluxed for three hours. The mixture was treated with 25 milliliters water, chilled to five degrees centigrade and brought to pH 1 with twenty milliliters 12 normal hydrochloric acid. The whole mixture was extracted three times with fifty milliliters ether. The combined extracts were washed with 150 milliliters of water, dried over anhydrous $Na_2SO_4$ and evaporated to dryness. The residue was crystallized from 150 milliliters of thirty percent ethanol (0.32 gram, melting point 135–144 degrees centigrade). This material is identical to Compound Aiv.

*Analysis.*—Calcd. for $C_{14}H_{18}O_4$: C, 67.18; H, 7.25. Found: A. C, 67.50; H, 7.04; B. C, 67.32, 67.47; H, 6.83, 6.92.

Ultraviolet absorption:

| | mμ | a | 70% EtOH | |
|---|---|---|---|---|
| | | | 0.01 N KOH | 0.01 N $H_2SO_4$ |
| A | 290 | 56.3 | x | |
| | 237 | 50.2 | | x |
| B | 290 | 48.8 | x | |
| | 237 | 48.8 | | x |

The material which could not be extracted from ether was separated by filtration and crystallized from ethanol (absolute 75 milliliters) to yield 1.0 gram (melting point 155–170 degrees centigrade). It was recrystallized from 25 milliliters 95 percent ethanol to yield 0.68 gram of compound BCi (Example 2) melting at 164–173 degrees centigrade.

*Example 6*

Following the procedure of Example 2, 3,3-isoamyl-4-acetoxybenzoic acid is hydrolyzed to 3-isoamyl-4-hydroxybenzoic acid.

*Example 7.—Compound BCiv*

A suspension of two grams (four millimoles) of Compound BCi in fifty milliliters of commercial anhydrous methanol and one milliliter of one normal sodium methoxide in methanol was heated under reflux for thirty minutes. During this time all of the original solid dissolved and the product separated as white crystals. After cooling to room temperature, the crystals were collected, washed with methanol and dried to yield 1.31 grams. The dense, white crystals melted at 268–272 degrees centigrade. Concentration of the mother liquor provided a second crop of 0.12 gram. For analysis a small portion of the first crop of crystals was recrystallized from a large volume of boiling acetone. Compound BCiv is neutral, non-reducing, ferric chloride and ninhydrin-negative, and only slightly soluble in all solvents tested with the exception of dimethylformamide.

*Analysis.*—Calcd. for $C_{21}H_{24}N_2O_9$; (448.42): C, 56.34; H, 5.40; N, 6.25; N-acetyl, 9.60. Found: C, 56.07, 56.97; H, 5.54, 5.76; N, 6.12, 6.25; N-acetyl, 8.55.

*Example 8.—3-(2,2-dimethyl-6-chromancarboxamido)-4,7-dihydroxy-8-methylcoumarin (ABi)*

(A) A solution of ten grams novobiocin (ABCi) (.0162 mole) in 100 milliliters absolute ethanol was heated to boiling under reflux. Following this, fifty milliliters concentrated hydrochloric acid was added to the refluxing solution over a period of seven minutes. (Precipitation of compound ABi began after 45 milliliters was added.) The mixture was heated under reflux an additional one-half hour, then cooled and filtered. The solid (6.1 grams, .0154 mole, 95 percent) was recrystallized from 400 milliliters n-butanol to yield 5.4 grams. This was then recrystallized from 1250 milliliters ethanol to yield 4.5 grams of 3-(2,2-dimethyl-6- chromancarboxamido) - 4,7 - dihydroxy - 8 - methylcoumarin (ABi) melting at 288–291 degrees centigrade.

*Analysis.*—Calcd. for $C_{22}H_{21}O_6N$: C, 66.82; H, 5.35; N, 3.54. Found: C, 67.52; H, 5.32; N, 3.59.
Ultraviolet absorption:

| mμ | a | 70% EtOH | | 95% EtOH |
| --- | --- | --- | --- | --- |
| | | 0.01 N KOH | 0.01 N H₂SO₄ | |
| 328 | 68.2 | x | | |
| 252 | 84.7 | x | | |
| 331 | 661.0 | | x | |
| 335 | 58.0 | | | x |

(B) One hundred milliliters of concentrated hydrochloric acid was added in four portions to a solution of ten grams of novobiocin in 250 milliliters of boiling 95 percent ethanol over a period of about two minutes. The solution was held at the boiling point for three or four minutes longer and 3-(2,2-dimethyl-6-chromancarboxamido) - 4,7 - dihydroxy-8-methylcoumarin (ABi) separated as fine needles. After standing at room temperature for forty minutes and refrigerating overnight, the crystals were collected, washed with ethanol, and dried to yield 5.78 grams, melting point 288–290 degrees centigrade.

*Example 9.—Ethyl 3(O)-carbamyl-4(O),5,5-trimethylpentopyranoside (Cii)*

The mother liquor of Example 8B was adjusted to pH 7 by addition of about 190 milliliters of six normal sodium hydroxide and concentrated under reduced pressure. The sodium chloride which separated was filtered off and the filtrate was evaporated to dryness. The resulting mixture of syrup and sodium chloride was extracted with acetone. Concentration of the extract gave a semi-solid mass of gum and crystals. This was slurried in a mixture of equal volumes of acetone and technical hexane (Skellysolve B); the crystals were collected, washed with fresh solvent and dried to yield 316 milligrams, melting point 172–176 degrees centigrade. The crude Cii crystals were recrystallized from a mixture of equal volumes of acetone and technical hexane with 72 percent recovery of material melting at 173–175 degrees centigrade. $[\alpha]_D^{25}$=minus 36 degrees (c, 1 in EtOH).

*Analysis.*—Calcd. for $C_{11}H_{21}NO_6$: C, 50.18; H, 8.04; N, 5.32; OCH₃, 11.79; OEt, 17.11. Found: C, 50.68; H, 8.16; N, 5.25; OCH₃, 11.71; OEt, 17.01.

*Example 10.—2,2 - dimethyl-6-chromancarboxylic acid (Aiii)*

(A) A solution containing ten grams (.025 mole) of 3 - (2,2 - dimethyl - 6 - chromancarboxamido) - 4,7 - dihydroxy-8-methylcoumarin (ABi), eighty milliliters pyridine, and ten milliliters (0.1 mole) acetic anhydride was heated under reflux three hours. After two milliliters water was added to the hot solution, it was cooled to five degrees centigrade and acidified to pH 2 with eighty milliliters twelve normal hydrochloric acid. The precipitate (fifteen grams) was crystallized in two crops, crop 1 (4.3 grams) from 400 milliliters 97 percent ethanol and crop 2 (4.6 grams) from the filtrate upon addition of 800 milliliters water. Crop 2 was then recrystallized from 97 percent ethanol twice yielding 2,2-dimethyl-6-chromancarboxylic acid (Aiii) melting at 184 degrees centigrade.

(B) A solution of one gram (.004 mole) 3-(2-isopentenyl)-4-acetoxybenzoic acid (Ai) in ten milliliters absolute ethanol was heated to boiling. Then five milliliters twelve normal hydrochloric acid was added and this solution refluxed one and one-half hours. It was cooled, added to 35 milliliters of water, and extracted with one-half volume ether. The ether was evaporated to yield an oil. Ultraviolet determinations showed the oil to have the same spectrum in acid and base, indicating an ester. The oil was dissolved in 35 milliliters absolute ethanol and treated with ten milliliters (.010 mole) one normal sodium hydroxide. The solution stood three days at 25 degrees, was then acidified with 100 milliliters 0.1 normal hydrochloric acid. The resulting white crystals were recrystallized from twenty milliliters fifty percent absolute ethanol to yield 0.55 gram (67 percent) of 2,2-dimethyl-6-chromancarboxylic acid (Aiii) melting at 181–193 degrees centigrade.

*Example 11.—2-methyl-5-(2-hydroxy-3-methyl-4-acetoxyphenyl)-4-oxazolecarboxylic acid, delta-lactone (Bii)*

The crop 1 crystals of Example 10A were recrystallized twice from absolute ethanol to yield the optically inactive 2 - methyl - 5 - (2 - hydroxy - 3 - methyl - 4 - acetoxyphenyl)-4-oxazolecarboxylic acid, delta-lactone (Bii) having the following properties:

(a) Melting point, 203–206 degrees centigrade.
(b) *Analysis.*—Calcd. for $C_{14}H_{11}NO_5$: C, 61.54; H, 4.06; N, 5.13. Found: C, 61.59; H, 3.77; N, 5.06.
(c) Ultraviolet absorption in 0.01 normal sulfuric acid in seventy percent ethanol

| mμ | a |
| --- | --- |
| 230 flex | 52.0 |
| 275 flex | 42.0 |
| 285 | 50.2 |
| 307 | 48.0 |
| 315 | 41.3 |
| 322 | 36.7 |

*Example 12.—3-amino-4-hydroxy-7-acetoxy-8-methylcoumarin hydrochloride (Biv·HCl)*

A solution of two grams (7.3 millimoles) of 2-methyl-5 - (2 - hydroxy - 3 - methyl - 4 - acetoxyphenyl) - 4-oxazolecarboxylic acid, delta-lactone (Bii), in 100 milliliters 3.5 normal methanolic hydrogen chloride and 400 milliliters methanol was heated under reflux for three hours, then stored at 24 degrees centigrade for sixteen hours. It was concentrated to 100 milliliters by distillation in vacuo, then chilled to minus ten degrees centigrade. The white precipitate which formed was removed and dried (1.50 grams), then recrystallized from 100 milliliters absolute ethanol and 200 milliliters ether to yield 1.15 grams of 3-amino-4-hydroxy-7-acetoxy-8-methylcoumarin hydrochloride (Biv·HCl) which melted with decomposition over the range 240–310 degrees centigrade. This material was ninhydrin-positive, without heating, and gave a pink, fading ferric chloride test.

*Analysis.*—Calcd. for $C_{12}H_{12}NO_5Cl$: C, 50.09; H, 4.90; N, 4.87; Cl, 12.33; C—CH₃, 4.73; N-acetyl, 14.60; OCH₃, 00. Found: C, 49.88, 49.37; H, 5.42, 5.30; N, 5.18; Cl, 11.20, 11.12; S—CH₃, 4.73; N-acetyl, 7.67; OCH₃, 0.91.

*Example 13.—3-acetamido-4,7-dihydroxy-8-methylcoumarin (Bvi)*

A solution containing three grams (10.4 millimoles of 2 - methyl - 5 - (2 - hydroxy - 3 - methyl - 4 - acetoxyphenyl)-4-oxazolecarboxylic acid, delta-lactone (Bii), fifty milliliters absolute ethanol, and 100 milliliters 0.6 normal sodium hydroxide was stored sixteen hours at 24 degrees centigrade. It was acidified to pH 1 with 22 milliliters of six normal hydrochloric acid, then distilled in vacuo under nitrogen until a large amount of light tan precipitate settled out. This was removed and dried yielding 2.85 grams of 3-acetamido-4,7-dihydroxy-8-methylcoumarin, Compound Bvi. It was then recrystallized by the evaporation of acetone from a fifty percent aqueous acetone solution yielding 2.25 grams of crystals which gradually decomposed above 230 degrees centigrade and gave a negative ninhydrin test.

*Analysis.*—Calcd. for $C_{12}H_{11}NO_5$: C, 57.83; H, 4.45;

N, 5.62 (mol. wt. 249.22). Found: C, 57.95, 58.03; H, 4.53, 4.12; N, 5.53, 5.53.

*Example 14.—3-amino-4,7-dihydroxy-8-methylcoumarin hydrochloride (Bi·HCl)*

(A) A suspension of two grams (4.45 millimoles) of Compound BCiv (Example 7) in 400 milliliters of anhydrous methanol plus 100 milliliters of 3.15 normal methanolic hydrogen chloride was heated under reflux with frequent swirling. After about two hours all of the crystals dissolved and the colorless solution was cooled, filtered, and concentrated in vacuo. Two compounds crystallized and were separated by fractional crystallization from a mixture of equal volumes of methanol and ether. In this experiment, 1.19 grams of 3-amino-4,7-dihydroxy-8-methylcoumarin hydrochloride (Bi·HCl) and 0.435 gram of the methyl 3(O)-carbamyl-4(O),5,5-trimethylpentopyranoside (Ci) were obtained. 3-amino-4,7-dihydroxy-8-methylcoumarin is less soluble in anhydrous methanol than the methyl 3(O)-carbamyl-4(O),5,5-trimethylpentopyranoside (Ci), is amphoteric, optically inactive, gives a pink color with ferric chloride, and melts poorly with decomposition above 200 degrees centigrade. This product gave a positive ninhydrin reaction in the cold.

*Analysis.*—Calcd. for $C_{10}H_{10}NO_4Cl$; (243.65): C, 49.49; H, 4.15; N, 5.77; Cl, 14.61. Found: C, 48.52, 48.01; H, 4.79, 5.47; N, 5.28, 5.44; Cl, 12.06.

(B) A solution of one gram (four millimoles) of 3-acetamido-4,7-dihydroxy-8-methylcoumarin (Bvi) in fifty milliliters of 3.5 normal methanolic hydrogen chloride and 200 milliliters anhydrous methanol was heated under reflux for two hours and stored at 24 degrees centigrade for sixteen hours. The solution was concentrated by distillation in vacuo to a fifty-milliliter volume, diluted with 200 milliliters ether and cooled to four degrees centigrade. The white crystals of 3-amino-4,7-dihydroxy-8-methylcoumarin hydrochloride (Bi·HCl) which separated were removed and dried (0.74 gram). This material retained its birefringence to 140 degrees centigrade but decomposed without melting upon heating to 300 degrees centigrade. This material was ninhydrin-positive in the cold and gave a pink ferric chloride test.

*Example 15.—3-amino-4,7-dihydroxy-8-methylcoumarin (Bi)*

(A) Recrystallization of the hydrochloride of Example 14 from water yielded the free base or zwitter-ion compound, 3-amino-4,7-dihydroxy-8-methylcoumarin (Bi).

(B) A 100-milligram quantity of 3-amino-4-hydroxy-7-acetoxy-8-methylcoumarin hydrochloride (Biv·HCl) was recrystallized from hot thirty percent aqueous ethanol to give 3-amino-4,7-dihydroxy-8-methylcoumarin (Bi). The dried crystalline product was birefringent to 190 degrees centigrade, but decomposed without melting upon heating to 300 degrees centigrade. The material was ninhydrin-positive in the cold, and gave a pink, fading ferric chloride test.

*Analysis.*—Calcd. for $C_{10}H_9NO_4$: C, 57.99; H, 4.38; N, 6.77; Cl, 00. Found: A. C, 57.69; H, 4.32; N, 6.25; B. C, 56.66, 56.37; H, 5.15, 4.79; N, 6.20; Cl, 0.10.

*Example 16.—Synthesis of 3-amino-4,7-dihydroxy-8-methylcoumarin (Bi)*

A.—4,7-DIHYDROXY-8-METHYLCOUMARIN

Dry hydrogen chloride was passed for two hours into a chilled mixture of 18.6 grams (0.15 mole) of 2-methylresorcinol, 18.6 grams (0.165 mole) of ethyl cyanoacetate, and 15 grams of fused, powdered zinc chloride in 125 milliliters of anhydrous ether. The mixture was allowed to stand overnight at room temperature and the ether was decanted. A large volume of water was added to the residue and the intermediate 7-hydroxy-8-methyl-4-imino-3,4-dihydrocoumarin was obtained as a solid which was isolated by filtration. The moist solid was heated for several hours with approximately ten times its weight of fifty percent sulfuric acid. Dilution with a large volume of water precipitated 4,7-dihydroxy-8-methylcoumarin which was collected by filtration and dried.

B.—3-AMINO-4,7-DIHYDROXY-8-METHYLCOUMARIN

Three grams of 4,7-dihydro-8-methylcoumarin was nitrated by the procedure of Link et al., J.A.C.S. 67, 99 (1945) and the resulting 3-nitro-4,7-dihydroxy-8-methylcoumarin was catalytically hydrogenated (ibid.) to 3-amino-4,7-dihydroxy-8-methylcoumarin. A melting point of a mixture of this product and that obtained by degradation of the antibiotic exhibited no depression.

*Example 17.—3-benzamido-4,7-dihydroxy-8-methylcoumarin (Biii)*

Benzoyl chloride (0.6 milliliter) was added with vigorous shaking in three equal portions to a solution of 0.46 gram of 3-amino-4,7-dihydroxy-8-methylcoumarin (Bi) dissolved in thirty milliliters of one normal sodium hydroxide. The reaction mixture was cooled in an ice bath. After two hours, the solution was filtered free of a trace of alkali-insoluble material and acidified with two normal hydrochloric acid. The orange precipitate which formed was filtered off, washed thoroughly with water and dried in a vacuum desiccator. The crude product was extracted with four 30–40 milliliter portions of boiling technical hexane (Skellysolve B) to remove benzoic acid. The material which failed to dissolve in technical hexane was recrystallized from 95 percent aqueous ethanol using Darco G–60 for decolorization, yielding 0.398 gram of 3-benzamido-4,7-dihydroxy-8-methylcoumarin (Biii) as very pale yellow crystals, melting point 309–310 degrees centigrade. For analysis, a portion of this material was recrystallized again from 95 percent aqueous ethanol.

*Analysis.*—Calcd. for $C_{17}H_{13}NO_5$: (311.28); C, 65.59; H, 4.21; N, 4.50. Found: C, 65.63, 65.77; H, 4.51, 4.19; N, 4.42.

Following the procedure of Example 17 substituting the benzoyl chloride by propionyl chloride, lauroyl chloride, and oleoyl chloride, there are obtained the corresponding N-alkanoylamides, namely, 3-propionamido-4,7-dihydroxy-8-methylcoumarin, 3-lauramido-4,7-dihydroxy-8-methylcoumarin, and 3-oleamido-4,7-dihydroxy-8-methylcoumarin.

*Example 18.—2-methyl-5-(2-hydroxy-3-methyl-4-acetoxyphenyl)-4-oxazolecarboxylic acid, delta-lactone (Bii)*

A solution of 515 milligrams of the benzoyl derivative of Example 17 in 45 milliliters of pyridine and fifteen milliliters of acetic anhydride was allowed to stand at room temperature for one hour and was then heated under reflux for one to two hours. After cooling, water and solid potassium bicarbonate were added and the solution was taken to dryness in vacuo. The residue was taken up in water and chloroform. After shaking, the layers were separated, and the aqueous phase was extracted with several portions of chloroform. The combined extracts were evaporated to dryness and the residue was recrystallized from ethanol and water to yield 100 milligrams of 2-methyl-5-(2-hydroxy-3-methyl-4-acetoxyphenyl)-4-oxazolecarboxylic acid, delta-lactone (Bii) nearly colorless crystals which melted at 201–203 degrees centigrade.

*Analysis.*—Calcd. for $C_{14}H_{11}NO_5$: (273.24); C, 61.54; H, 4.07; N, 5.13. Found: C, 61.84; H, 3.80; N, 5.12.

*Example 19.—4,7-dihydroxy-3-[4-hydroxy-3-(isopentenyl)-benzamido]-8-methylcoumarin (ABii)*

To ten grams of novobiocin (0.016 mole) in 100 milliliters of absolute ethanol, there was added 0.5 gram (0.0064 mole) of acetyl chloride as a catalyst. The reaction mixture was heated under reflux for two hours and cooled. With stirring there was slowly added 300 milliliters of water. After filtering and washing with cold anhydrous ethanol, there was obtained six grams of 4,7-dihydroxy-3-[4-hydroxy-3-(2-isopentenyl)-benzamido]-8-methylcoumarin (ABii) having a melting point of 167–175 degrees centigrade. This compound has antibacterial activity against such organisms as *Streptococcus hemolyticus, Bacillus subtilus,* and *Staphylococcus albus.*

On treatment of this compound with acetic anhydride by the procedure of Examples 10A and 11, there was obtained compounds Bii and Ai. On treatment with ethanol and concentrated hydrochloric acid by the procedure of Example 8A, there was obtained compound ABi. On hydrogenation over platinum oxide by the procedure of Example 5A, there was obtained 4,7-dihydroxy-3-(4-hydroxy-3-isoamylbenzamido)-8-methylcoumarin (ABiii). Compound ABiii can also be obtained by treating dihydronovobiocin (ABCii) with ethanol and a catalytic amount of acetyl chloride by the procedure of this example. Compound ABiii has the same antibacterial activity as compound ABii. On reacting compound ABiii with acetic anhydride by the procedure of Examples 10A and 11, there was obtained compounds Bii and Aiv.

The sequence of reactions given in this example are shown in the following chart:

CHART 6

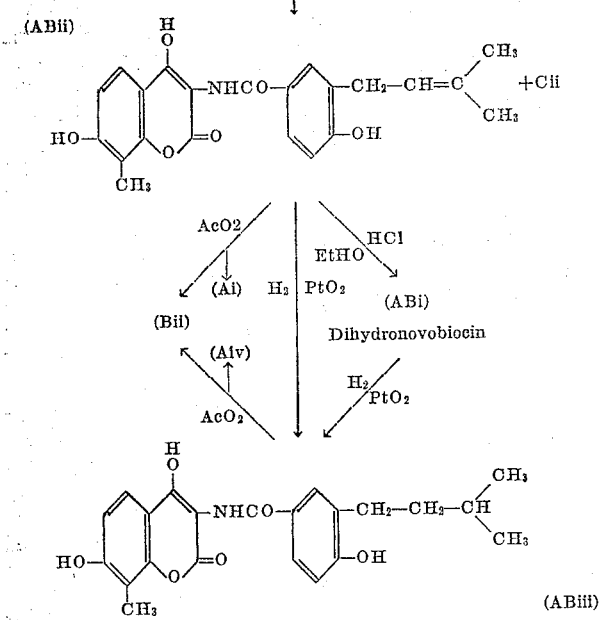

Example 20.—4-acetoxy-3-(2-isopentenyl)-benzoyl chloride (Avi)

To ten grams (0.04 mole) of compound Ai (Example 1) was added twenty milliliters of thionyl chloride. The mixture was stirred ten minutes at eighty degrees centigrade, then cooled and diluted with thirty milliliters of water. The oily precipitate was extracted into fifty milliliters of ether. On evaporation of the ether there was obtained 9.8 grams of 4-acetoxy-3-(2-isopentenyl)-benzoyl chloride.

Example 21.—4-acetoxy-3-isoamylbenzoyl chloride (Avii)

On substituting compound Aiv (Example 5) for Compound Ai in the procedure of Example 20, there was obtained 4-acetoxy-3-isoamylbenzoyl chloride.

Example 22.—4,7-dihydroxy-3-[4-hydroxy-3-(2-isopentenyl)-benzamido]-8-methylcoumarin (ABii)

On substituting compound Avi (Example 20) for the benzoyl chloride of Example 17, there was obtained 4,7-dihydroxy-3-[4-hydroxy-3-(2-isopentenyl)-benzamido]-8-methylcoumarin.

Example 23.—4,7-dihydroxy-3-(4-hydroxy-3-isoamylbenzamido)-8-methylcoumarin (ABiii)

On substituting compound Avii (Example 21) for the benzoyl chloride of Example 17, there was obtained 4,7-dihydroxy-3-(4-hydroxy-3-isoamylbenzamido)-8-methylcoumarin.

Example 24.—Methyl 3(O)-carbamyl-4(O),5,5-trimethylpentopyranoside (Ci)

The methyl pyranoside Ci produced in Example 14A was recrystallized from a mixture of equal volumes of acetone and technical hexane (Skellysolve B) to give colorless plates which are neutral, ninhydrin-negative, show only end absorption in the ultraviolet, melt at 197–198 degrees centigrade and are optically active. $[\alpha]_D^{25}=$ minus 24.7 degrees (c, 1 in 95 percent EtOH).

*Analysis:*—Calcd. for $C_{10}H_{19}NO_6$: (249.29); C, 48.19; H, 7.68; N, 5.62. Found: C, 48.11; H, 7.71; N, 5.61.

Example 25.—Carbonate ester Ciii

A solution of 1.03 grams (four millimoles) of methyl 3(O)-carbamyl-4(O),5,5-trimethylpentopyranoside (Ci) in 175 milliliters of absolute methanol and forty milliliters of three normal methanolic hydrogen chloride was heated under reflux for 3.5 hours. The solution was concentrated to dryness in vacuo. The residue was slurried in ten to twelve milliliters of acetone and 98.4 milligrams of insoluble ammonium chloride removed. The filtrate was evaporated to about five milliliters under nitrogen jet and 245.2 milligrams of unreacted methyl pyranoside Ci recovered. The filtrate was concentrated under nitrogen to dryness. The remaining hydrogen chloride was dispelled by vacuum drying and the residue was extracted with fifteen milliliters of hot water. On cooling, a crop of colorless crystals was obtained, 109 milligrams, melting point 122–128 degrees centigrade. The crude crystals were purified by sublimation at about 120 degrees centigrade and 20–25 millimeters mercury. The sublimate melted at 132–132.5 degrees centigrade.

*Analysis:*—Calcd. for $C_{10}H_{16}O_6$: C, 51.71; H, 6.95; $2OCH_3$, 26.73. Found: C, 51.97; H, 6.91; $OCH_3$, 27.59.

Example 26.—Methyl 4(O),5,5-trimethylpentopyranoside (Civ)

Two grams (about eight millimoles) of the methyl pyranoside Ci of Example 24 was dissolved in 75 milliliters of water by warming. The solution was cooled to room temperature and 55 milliliters of saturated barium hydroxide solution was added. After standing for sixteen hours at room temperature in a flask protected from atmospheric carbon dioxide with an Ascarite (NaOH on asbestos) tube, the precipitate of barium carbonate was removed by filtration. The excess barium hydroxide was neutralized with carbon dioxide (Dry Ice) and again the precipitate was removed by filtration. The filtrate was taken to dryness in vacuo and the residue dissolved in ether. The solution was filtered free of a small amount of barium carbonate and evaporated to yield 1.608 grams (97%) of a colorless oil which crystallized on standing. After recrystallization from boiling technical hexane (Skellysolve B), the product melted at 65–70 degrees and had a specific rotation $[\alpha]_D^{25}=$minus 39 degrees (c, 1.0 in 0.5 normal sulfuric acid). The compound consumes one mole of periodate rapidly without the formation of acidic products or formaldehyde.

*Analysis.*—Calcd. for $C_9H_{18}O_5$: C, 52.41; H, 8.80; $OCH_3$, 30.0. Found: C, 52.82; H, 8.55; $OCH_3$, 26.8.

Methyl 4(O),5,5-trimethylpentopyranoside (Civ) can also be made from the carbonate ester Ciii of Example 25 by the same procedure with this modification: the reaction with barium hydroxide requires only one hour instead of sixteen hours.

*Example 27.—4(O),5,5-trimethylaldopentose (Cv)*

A solution of 1.202 grams (5.8 millimoles) of methyl 4(O),5,5-trimethylpentopyranoside (Cvi) in 120 milliliters of 0.5 normal sulfuric acid was heated to eighty degrees on the steam bath. After 30-45 minutes, the rotation became constant and the reaction was considered complete. After cooling to room temperature, excess barium carbonate was added to neutralize the sulfuric acid. The precipitate of barium sulfate and barium carbonate was removed by filtration and the neutral filtrate concentrated to dryness in vacuo. The residue was taken up in ethanol, the solution filtered free of insoluble salts, and evaporated yield 1.07 grams (96%) of a colorless oil which crystallized on drying in a vacuum desiccator. After recrystallization from ethyl acetate, the crystals melted at 128-130 degrees centigrade with a specific rotation $[\alpha]_D^{25}$=plus 38 degrees (c, 1.0 in 0.5 normal sulfuric acid). The compound consumes two moles of periodate with the formation of two moles of formic acid but no formaldehyde.

Analysis.—Calcd. for $C_8H_{16}O_5$: C, 49.98; H, 8.39; $OCH_3$, 16.1. Found: C, 49.71; H, 8.50; $OCH_3$, 14.95.

*Example 28.—3(O)-carbamyl-4(O),5,5-trimethyl-pentopyranose (Cvi)*

A solution of 300 milligrams of methyl 3(O)-carbamyl-4(O),5,5-trimethylpentopyranoside (Ci) in thirty milliliters of 0.5 normal sulfuric acid was heated at eighty degrees until the observed rotation reached a constant value (50-60 minutes). The solution was cooled quickly to room temperature and neutralized with an excess of barium carbonate. After removing the insoluble salts, the solution was concentrated to dryness and the residue taken up in ethanol. The small amount of insoluble salts was removed by filtration and the filtrate evaporated to dryness to yield 290 miligrams of a colorless glass. The product consumed one mole of periodate with the formation of one mole of formic acid.

Analysis.—Calcd. for $C_9H_{17}NO_6$: C, 45.95; H, 7.29; N, 5.96. Found: C, 45.95; H, 7.66; N, 5.92.

By heating 3(O)-carbamyl-4(O),5,5-trimethylpyranose (Cvi) in an alcohol saturated with dry hydrogen chloride, the corresponding pyranoside is obtained. For example, from such lower alkanols as methanol, ethanol, isopropanol, n-propanol, n-butanol, 2-ethylhexanol, and the like, there are obtained methyl, ethyl, isopropyl, n-propyl, n-butyl, and 2-ethylhexyl 3(O)-carbamyl-4(O),5,5-trimethylpyranosides. By treating these pyranosides by the procedure of Example 26, ethyl, isopropyl, n-propyl, n-butyl, and 2-ethylhexyl 4(O),5,5-trimethylpentopyranosides are obtained. The corresponding carbonate esters are obtained by the procedure of Example 25.

*Example 29.—1,2,3,5-tetrahydroxy-4-methoxy-4-methylhexane (Cvii)*

A solution of 400 milligrams of 4(O),5,5-trimethylaldopentose (Cv) in 25 milliliters of 95 percent aqueous ethanol was hydrogenated at forty pounds per square inch gauge hydrogen pressure in the presence of 100 milligrams of platinum oxide catalyst for sixteen hours. The solution was filtered free of catalyst and evaporated to yield 405 milligrams of a colorless viscous oil which consumed two moles of periodate within one hour with the production of one mole of formaldehyde and one mole of formic acid. The formaldehyde was isolated as the dimedon derivative and the formic acid was identified by potentiometric titration.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound having the formula:

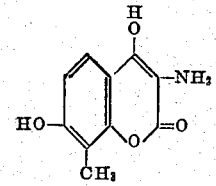

2. A compound having the formula:

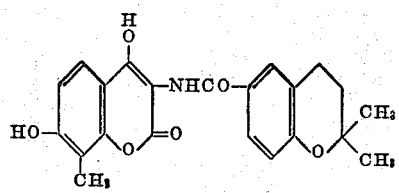

3. A compound having the formula:

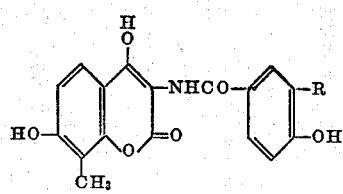

wherein R is selected from the group consisting of 2-isopentenyl and isoamyl radicals.

4. A compound having the formula:

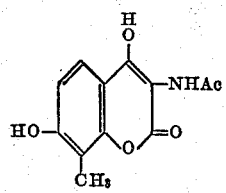

in which Ac is acetyl.

5. A compound having the formula:

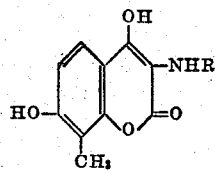

in which R is an alkanoyl radical having not more than eighteen carbon atoms.

6. 3-benzamido-4,7-dihydroxy-8-methylcoumarin.

References Cited in the file of this patent

UNITED STATES PATENTS

| | | |
|---|---|---|
| 2,209,055 | Hanford | July 23, 1940 |
| 2,584,129 | Hockett | Feb. 5, 1952 |
| 2,609,370 | Gaver et al. | Sept. 2, 1952 |
| 2,648,682 | Stoll et al. | Aug. 11, 1953 |
| 2,650,941 | Koome et al. | Sept. 1, 1953 |
| 2,744,115 | Hughes | May 1, 1956 |
| 2,746,971 | Dorton | May 22, 1956 |
| 2,752,360 | Starr et al. | June 26, 1956 |